United States Patent
Vandikas et al.

(10) Patent No.: US 10,013,238 B2
(45) Date of Patent: Jul. 3, 2018

(54) PREDICTING ELEMENTS FOR WORKFLOW DEVELOPMENT

(71) Applicant: Telefonaktiebolaget L M Ericsson (publ), Stockholm (SE)

(72) Inventors: Konstantinos Vandikas, Solna (SE); Hongxin Liang, Upplands Väsby (SE); Dmitri Mazmanov, Solna (SE); Joerg Niemoeller, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 23 days.

(21) Appl. No.: 14/910,819

(22) PCT Filed: Aug. 12, 2013

(86) PCT No.: PCT/EP2013/066842
§ 371 (c)(1),
(2) Date: Feb. 8, 2016

(87) PCT Pub. No.: WO2015/022009
PCT Pub. Date: Feb. 19, 2015

(65) Prior Publication Data
US 2016/0188298 A1    Jun. 30, 2016

(51) Int. Cl.
*G06F 9/44* (2018.01)
*G06F 8/20* (2018.01)
(Continued)

(52) U.S. Cl.
CPC ............ *G06F 8/20* (2013.01); *G06F 3/04842* (2013.01); *G06Q 10/063* (2013.01); *G06Q 10/103* (2013.01); *G06F 8/34* (2013.01)

(58) Field of Classification Search
None
See application file for complete search history.

(56) References Cited

U.S. PATENT DOCUMENTS 7,886,264 B1    2/2011  Peyton et al.
9,274,668 B2 *  3/2016  Powers ................ G06F 3/0484
(Continued)

FOREIGN PATENT DOCUMENTS

EP       2 579 151 A1      4/2013
WO   WO 2007/068527 A1    6/2007

OTHER PUBLICATIONS

International Search Report for International application No. PCT/EP2013/066842, dated Mar. 12, 2014.
(Continued)

*Primary Examiner* — Chameli Das
(74) *Attorney, Agent, or Firm* — Baker Botts, LLP

(57) ABSTRACT

This technology may be used to predict elements for workflow development. A current configuration of the new workflow is received, and workflow element choices for a next element to be added to the new workflow are determined a long with a respective probability of relevance associated with each of the workflow element choices. The workflow element choices are arranged in accordance with the respective probability of relevance associated with each of the workflow element choices for selection by the user. The workflow element choices may be determined using the current configuration of the new workflow and previously-developed workflows stored in storage accessible by the processing system.

14 Claims, 12 Drawing Sheets

(51) Int. Cl.
    *G06Q 10/06*     (2012.01)
    *G06Q 10/10*     (2012.01)
    *G06F 3/0484*     (2013.01)
    *G06F 8/34*     (2018.01)

(56) References Cited

U.S. PATENT DOCUMENTS

| | | | |
|---|---|---|---|
| 2003/0009507 A1* | 1/2003 | Shum | G06F 11/3409 718/104 |
| 2004/0083448 A1* | 4/2004 | Schulz | G06Q 10/06 717/101 |
| 2004/0243977 A1 | 12/2004 | Shou et al. | |
| 2006/0074732 A1* | 4/2006 | Shukla | G06F 8/36 717/106 |
| 2006/0236304 A1 | 10/2006 | Luo et al. | |
| 2007/0245300 A1* | 10/2007 | Chan | G06Q 10/06 717/105 |
| 2009/0171732 A1* | 7/2009 | Bobak | G06Q 10/0633 705/7.13 |
| 2010/0131952 A1* | 5/2010 | Akiyama | G06F 11/0748 718/100 |
| 2011/0209162 A1* | 8/2011 | Machiraju | G06F 8/20 719/328 |
| 2012/0078678 A1* | 3/2012 | Pradhan | G06Q 10/0633 705/7.27 |
| 2012/0116980 A1* | 5/2012 | Mercuri | G06Q 10/103 705/301 |
| 2012/0137367 A1* | 5/2012 | Dupont | G06F 21/00 726/25 |
| 2014/0075004 A1* | 3/2014 | Van Dusen | H04L 41/04 709/223 |
| 2014/0095201 A1* | 4/2014 | Farooq | G06F 19/3431 705/3 |
| 2014/0236663 A1* | 8/2014 | Smith | G06Q 10/0633 705/7.27 |
| 2016/0162837 A1* | 6/2016 | Muntes Mulero | G06Q 10/103 705/301 |

OTHER PUBLICATIONS

"Automatic User Support for Business Process Modeling" by Stefanie Betz et al.; Institute of Applied Informatics and Formal Description Methods, 2006.
"An Intelligent Assistant for Interactive Workflow Composition" by Jihie Kim et al.; University of Southern California/Information Sciences Institute Published on 2004.
"Top 20 Features of Code Completion in IntelliJ IDEA" by Andrey Cheptsov, Sep. 19, 2012.
"IntelliJ IDEA" from Wikipedia; https://en.wikipedia.org/wiki/IntelliJ_IDEA, Jan. 21, 2016.
"Microsoft Visual Studio" from Wikipedia; https://en.wikipedia.org/wiki/Microsoft_Visual_Studio, Jan. 21, 2016.

* cited by examiner

| | event | task | decision |
|---|---|---|---|
| event | 0 | 1 | 0 |
| task | 0.5 | 0 | 0.5 |
| decision | 0 | 1 | 0 |

PREDICTING ELEMENTS FOR WORKFLOW DEVELOPMENT

PRIORITY

This nonprovisional application is a U.S. National Stage Filing under 35 U.S.C. § 371 of International Patent Application Serial No. PCT/EP2013/066842, filed Aug. 12, 2013, and entitled "Predicting Elements For Workflow Development."

TECHNICAL FIELD

The technology described in this disclosure relates to workflow development using one or more computers.

BACKGROUND

This section is intended to provide a background to the various embodiments described. Unless otherwise specifically indicated, what is described in this section is not prior art to the description and/or claims of this disclosure and is not admitted to be prior art by the mere inclusion in this section.

Auto-completion is used in Integrated Development Environments (IDEs) to assist a developer in the process of writing software by presenting a list of possible alternative choices the developer has when typing a set of commands. Some early auto-completion products relied upon the object-oriented nature of the programming language being used. When a developer types the name of an instance of a class and then presses a particular key, the IDE tool would present a dropdown list with options that contain the functions/or variables of that specific class. Some other auto-completion products further refined those alternative choices based on characteristics of the underlying programming language. For example, when the user writes an expression that sums two integer numbers, after she has pressed the symbol "+" (plus) the IDE would automatically recommend the name of the variable whose type matches that of the first operand. The IDE would also propose other variables which are available in the same scope but whose type does not match directly, but could match using type-casting (i.e. from String to Integer).

Moreover, some IDEs provide code suggestions by automatically creating placeholders in the body of a class for the different functions required by an interface implemented by that class. These features, which are used in IDEs for textual programming languages, rely on syntax, type, and availability of functions or variables of the programming language.

Similar auto-completion techniques have been proposed for workflow development languages in order to complement manual workflow development and help the developer avoid typos and structural development errors. However, further improved techniques for assisting the workflow developer are needed.

SUMMARY

The present disclosure presents methods, apparatus, systems, nodes, and computer-readable media for predicting workflow elements to be incorporated into a new workflow that is being developed.

In a non-limiting example embodiment, a method for automatically predicting workflow elements to be incorporated into a new workflow includes: receiving a current configuration of the new workflow that is being developed by a user on a workflow development environment (e.g., workflow IDE); determining, using the current configuration and previously developed workflows stored in storage accessible by the processing system, a plurality of workflow element choices for a next element to be added to the new workflow and a respective probability of relevance associated with each of the workflow element choices; and providing the plurality of workflow element choices arranged in accordance with the respective probability of relevance associated with each of the workflow element choices for selection by the user as the next element.

In another embodiment, determining a plurality of workflow element choices for a next element includes selecting workflows that are contextually similar to the new workflow from the previously developed workflows, and determining the plurality of workflow element choices based upon the selected workflows and the current configuration.

In another embodiment, determining a plurality of workflow element choices for a next element includes determining a set of keywords associated with the new workflow, determining similarities of the new workflow to respective ones of the previously developed workflows based upon the set of keywords, and selecting ones of the previously developed workflows having respective determined similarities that exceed a threshold.

In another embodiment, determining a plurality of workflow element choices for a next element includes combining workflow transition information from the current configuration and the previously developed workflows, determining the plurality of workflow element choices from the combined workflow transition information, and calculating the respective probability of relevance associated with each of the workflow element choices.

The combining workflow transition information may include performing a weighted combination of matrices representing workflow transitions, and wherein elements of each of the matrices define respective probabilities of a first workflow element transitioning to respective second workflow elements.

The performing a weighted combination may include adding of a weighted first matrix representing workflow transitions of the current configuration and a weighted second matrix representing ranked workflow transitions of the previously developed workflows.

The first matrix and the second matrix may be formed by adding matrices representing the current configuration and the previously developed workflows, respectively.

In another embodiment, a method may also include updating the workflow transition information from the previously developed workflows in accordance with said one of the workflow element choices selected as the next element by the user.

Determining a plurality of workflow element choices for a next element may include selecting a plurality of next workflow elements, each selected next workflow element being a valid next workflow element for the current configuration of the new workflow; calculating a respective probability of relevance for each selected next workflow element based upon occurrence characteristics of the selected next workflow element; and selecting one or more next workflow element labels for each selected next workflow element.

For each selected next workflow element, each selected one or more next workflow element labels is associated with a likelihood that the selected next workflow element label occurs with the selected next workflow element.

The likelihood that the selected next workflow element label occurs with the selected next workflow element is determined based upon a count of occurrences of the selected next workflow element label being assigned to the selected next workflow element in the previously developed workflows.

Selecting one or more next workflow element labels may include selecting the one or more next workflow element labels based upon a partial label input by the user as part of a label of the next element, and upon label assignments in the previously developed workflows.

Another embodiment includes a computer-implemented workflow generation system. The system includes: a workflow repository configured to store previously developed workflows; at least one first computer configured to execute a workflow development environment for interaction with a user to develop a new workflow; at least one second computer configured to automatically predict one or more workflow elements for incorporating into the new workflow, and further configured to: receive a current configuration of the new workflow that is being developed by the user on the workflow development environment executing on the first computer; determine, using the current configuration and the previously developed workflows, a plurality of workflow element choices for a next element to be added to the new workflow and a respective probability of relevance associated with each of the workflow element choices; and provide the plurality of workflow element choices arranged in accordance with the respective probability of relevance associated with each of the workflow element choices for selection by the user as the next element.

The computer-implemented workflow generation system may also include: at least one third computer configured as a user context manager. The third computer may be configured to: receive contextual information associated with the new workflow; and select a plurality of said previously developed workflows from the workflow repository. Context information of the selected plurality of the previously developed workflows is similar to the received contextual information.

The computer-implemented workflow generation system may further include: at least one fourth computer configured as a transition matrix generator. The fourth computer may be configured to receive workflow information, and generate one or more transition matrices corresponding to the received workflow information.

The transition matrix generator of the workflow generation system may be configured to store the generated one or more transition matrices in a transition matrix repository.

The first computer of the workflow generation system may be configured to generate one or more transition matrices for the new workflow, and maintain a cache comprising the plurality of workflow element choices arranged in accordance with the respective probability of relevance associated with each of the workflow element choices.

Another embodiment includes a node for automatically predicting workflow elements to be incorporated into a new workflow being developed. The node includes memory; network interface; and a processing system including one or more processors communicatively coupled to the memory and the network interface. The node is configured to: receive a current configuration of the new workflow that is being developed by a user on a workflow development environment; determine, using the current configuration and previously developed workflows stored in storage accessible by the processing system, a plurality of workflow element choices for a next element to be added to the new workflow and a respective probability of relevance associated with each of the workflow element choices; and provide the plurality of workflow element choices arranged in accordance with the respective probability of relevance associated with each of the workflow element choices for selection by the user as the next element.

A non-transitory computer-readable storage medium having instructions stored therein for automatically predicting workflow elements to be incorporated into a new workflow that is being developed, the instructions when executed by at least one processor, causes the processor to perform operations comprising: receiving a current configuration of the new that is being developed by a user on a workflow development environment executing on a computer; determining, using the current configuration and previously developed workflows stored in storage accessed by the processing system, a plurality of workflow element choices for a next element to be added to the new workflow and a respective probability of relevance associated with each of the workflow element choices; and providing the plurality of workflow element choices arranged in accordance with the respective probability of relevance associated with each of the workflow element choices for selection by the user as the next element.

Yet another embodiment includes a node for developing a new workflow which includes memory, network interface, and a processing system. The node is configured to: identify one or more workflow elements to be extended in the new workflow that is being developed by a user on a workflow development environment executing on the node; collecting workflow transition matrices representing workflow transitions in the new workflow; transmitting a current configuration of the new workflow, including the one or more workflow elements to be extended and the collected workflow transition matrices to a remote computer, wherein the remote computer is configured to determine, using the current configuration and previously developed workflows stored in storage, a plurality of workflow element choices for a next element to be added to the new workflow and a respective probability of relevance associated with each of the workflow element choices; receiving the plurality of workflow element choices and a relative relevance of each of the workflow element choices from the remote computer, the relative relevance determined in accordance with the corresponding respective probability of relevance; displaying one or more of the received workflow element choices arranged in order of the relative relevance of each of the one or more received workflow elements; receiving input from the user based upon the displayed one or more received workflow element choices; and adding one or more of a new workflow element or a new workflow element label to the new workflow, the one or more of a new workflow element or a new workflow element label determined based upon the received input from the user.

The processing system of the node is further configured to transmit information including the added new workflow element or a new workflow element label to a remote computer for updating the previously developed workflows.

BRIEF DESCRIPTION OF THE DRAWINGS

These and other aspects, features, and advantages will be apparent and elucidated from the following description of example embodiments reference being made to the accompanying drawings, in which.

DETAILED DESCRIPTION

The following sets forth specific details, such as particular embodiments for purposes of explanation and not limitation. It will be appreciated by one skilled in the art that other embodiments may be employed apart from these specific details. In some instances, detailed descriptions of well known methods, nodes, systems, interfaces, circuits, and devices are omitted so as not obscure the description with unnecessary detail. Those skilled in the art will appreciate that the functions described may be implemented in one or more nodes using hardware circuitry and/or using software programs and data in conjunction with one or more digital microprocessors or general purpose computers. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Figures 5A, 5B:
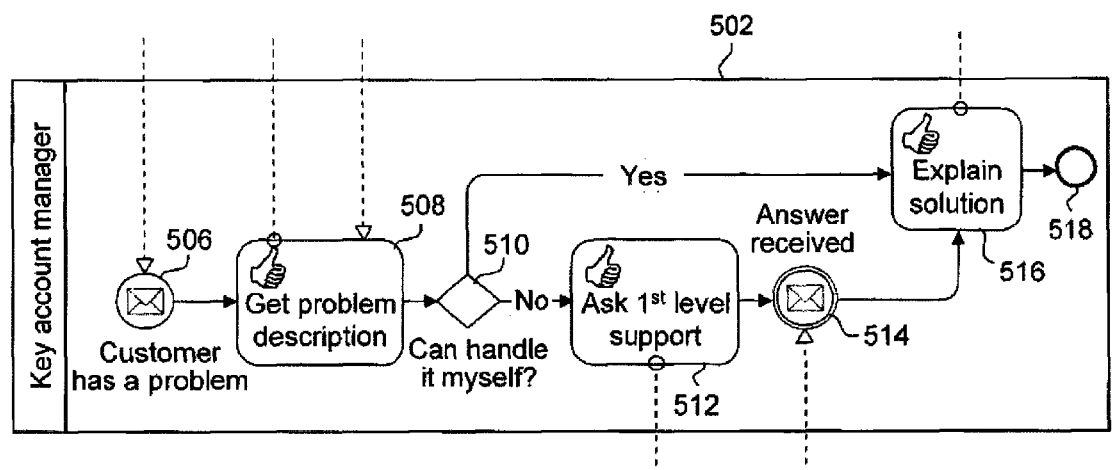
FIGS. 5A and 5B show an example workflow and a corresponding transition table, respectively, according to one or more embodiments.

A "workflow" comprises a group of workflow elements organized into a sequence, and, as the term is used herein, is a computer-based representation (e.g., a graphical representation) of a process or activity. Example workflow element types include, but are not limited to, events, tasks, and decision points. An event element may represent an observable occurrence, whereas a task element may represent work to be performed. A decision point element may be used to represent instances where a decision is required to be made, and where the next element is dependent on the decision. FIG. 5A (described later in this disclosure) is an illustrative example representation of a workflow.

Workflows may be used to specify or model processes or activities in any environment. Workflows are used extensively in operational support systems (OSS, also referred to as operation support systems) and business support systems (BSS). In the area of telecommunications, workflows may be developed in OSS for activities such as, for example, maintaining network inventory, provisioning services, configuring network components, and managing faults. Workflows in BSS may be developed for activities such as, for example, dealing with customers, supporting processes such as taking orders, processing bills, and collecting payments.

The development of workflows is prone to errors. Workflow IDEs are used by users. A workflow IDE executing on a computer provides the user with a graphical interface and tools to perform functions such as creating, modifying and saving workflows. Conventional workflow IDEs, however, are limited in their ability to assist the user who is developing a new workflow or modifying a previously created workflow. For example, auto-completion features in many conventional workflow IDEs only take into account the features of the workflow language (i.e. syntax, linguistic, structural).

Embodiments of the technology in this disclosure include an auto-completion mechanism for workflow development environments, such as the workflow IDEs noted above, that takes into account previously developed workflows. Previously developed workflows may have been developed or modified by the same user or by other users working in similar environments or contexts. The considering of previously developed workflows may be in addition to considering the features of the workflow language. By considering previously developed workflows in the same or similar contexts, embodiments include advantages such as reducing the time to develop a workflow, increasing the accuracy of the developed workflow, and increasing the consistency between workflows developed for a particular environment or context. One or more of the embodiments may make context-aware predictions that can assist a workflow developer to decide the next element in a workflow and/or the label of the next element based upon factors including characteristics of previously developed workflows.

The advantages of workflow IDEs according to embodiments disclosed herein are enhanced when the workflow IDEs are integrated with, or otherwise provided with access to, the cloud or other network where developers work collaboratively and the developers' work is stored such that it can be further re-used to assist other developers in developing new workflows. The term "new workflow," as used herein, may refer to a workflow that is being created or a previously created workflow which is being modified (e.g., edited). An embodiment can be implemented as a service in the cloud and exposed using an application program interface (API), so that a workflow IDE can, at design-time, consult the prediction system in the cloud in order to assist developers in designing their workflows.

Figure 1:
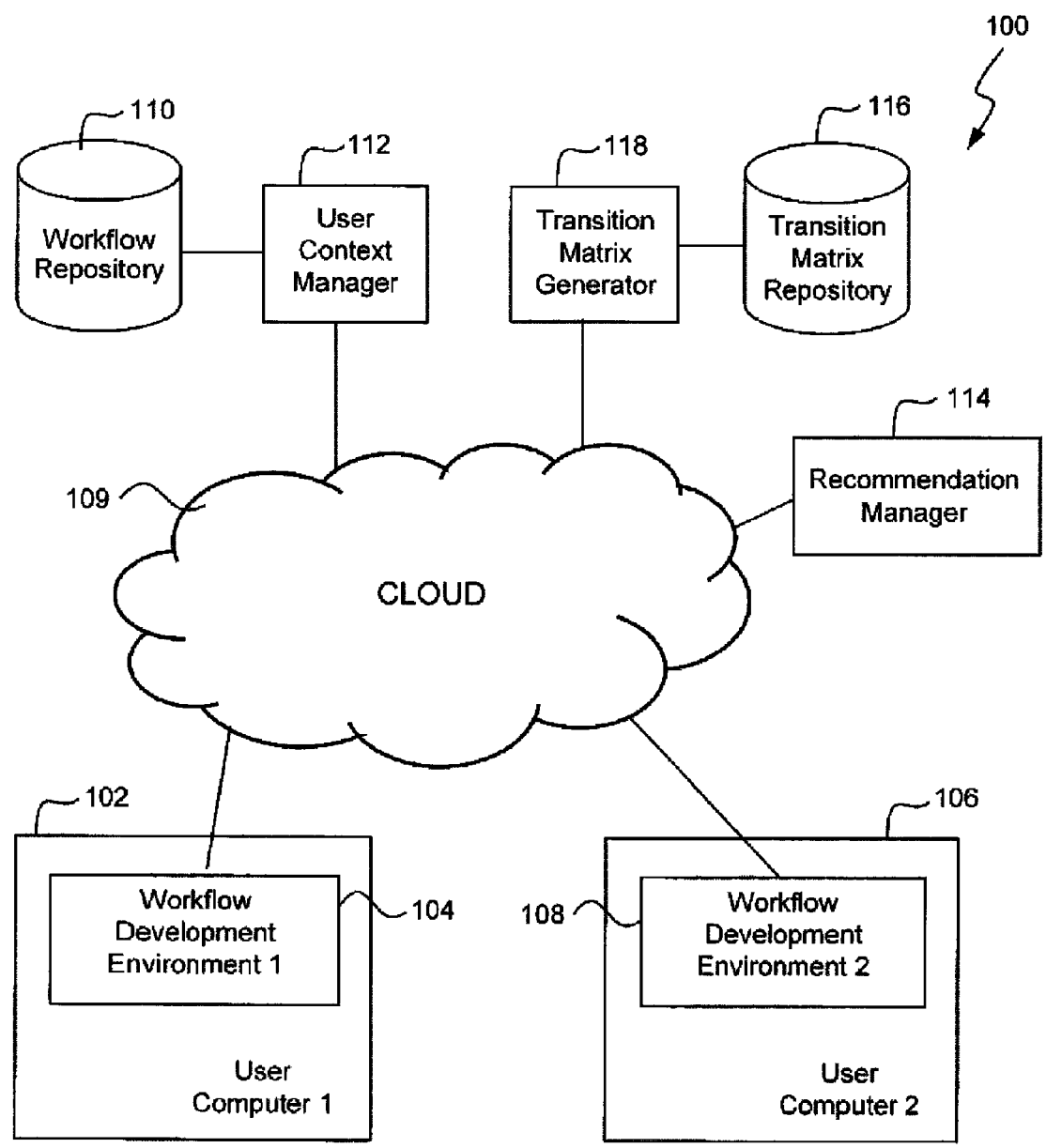
FIG. 1 shows a system for predicting workflow elements to be incorporated into a new workflow, according to one or more embodiments.

FIG. 1 shows a system 100 for predicting workflow elements to be incorporated into a new workflow, according to some embodiments. System 100 includes one or more user computers such as user computers 102 and 106, a workflow repository 110, a user context manager 112, a recommendation manager 114, a transition matrix repository 116, and a transition matrix generator 118. A cloud network ("cloud") or other network 109 provides user computers 102 and 106 with access to other parts of system 100. Network 109 may include, for example, any of local area network, wide area network (e.g., the Internet, corporate internet, corporate wide area network), public network, private network, wired network, and wireless network.

User computers 102 and 106 may be any type of computer which executes a program for creating or modifying a workflow. In the embodiment of FIG. 1, user computers 102 and 106 have workflow developments environments (e.g., workflow IDEs) 104 and 108 executing on their processors, respectively. Workflow development environments 104 and 108 may be used by users (e.g., developers) to either separately or collaboratively develop one or more workflows. In some embodiments, workflow development environments 104 and 108 may be used by separate developers working in the same or similar environment. For example, workflow development environments 104 and 108 can be used by two developers working separately, at the same time or at different times, to develop workflows related to service provisioning, for example, in a telecommunications OSS.

Each workflow development environment 104 and 108 provides a user with a graphical interface to develop (e.g., create or modify) a workflow. The user may interact with workflow development environment 104 or 108 through any form of input device capable of providing input to a program executing on a computer. The computer program code which implements workflow development environments 104 and 108 may reside locally or remotely, or in a combination of local and remote storage devices.

Workflow repository 110 comprises one or more storage devices configured to store previously developed workflows. Workflow repository 110 may, in some embodiments, be a distributed storage. For example, workflow repository 110 may be implemented as a cloud storage. In some embodiments, parts or all of workflow repository 110 may be local to one or more of local computers 102 and 106. The stored information for each previously developed workflow may include information regarding the elements of the workflow and textual description(s) associated with the workflow. Other data, such as indexes and other identifying and/or classifying information for the stored workflows may also be stored in workflow repository 110. The information may be stored in a manner that provides for access based upon criteria, such as, but not limited to, the user or keywords. The information in the workflow repository may be organized in an XML file, or as a database.

User context manager 112 operates to provide access to workflow repository 110, and may include operations to store workflows in accordance with a context associated with each workflow and to return one or more workflows from repository 110 that match a context indicated by a requestor.

Transition matrix repository 116 is a storage configured to store transition matrices, which are matrices descriptive of characteristics of particular workflows, and may be located remotely to or locally with any of the other components of system 100. Transition matrix generator 118 operates to generate a transition matrix for each workflow or group of workflows provided to it as input. Transition matrices are further described below.

Recommendation manager 114 operates to interact with workflow development environments 104 and 108 in order to provide auto-completion in a context-aware manner to a user or users developing workflows on development environments 104 and 108.

Figure 2:
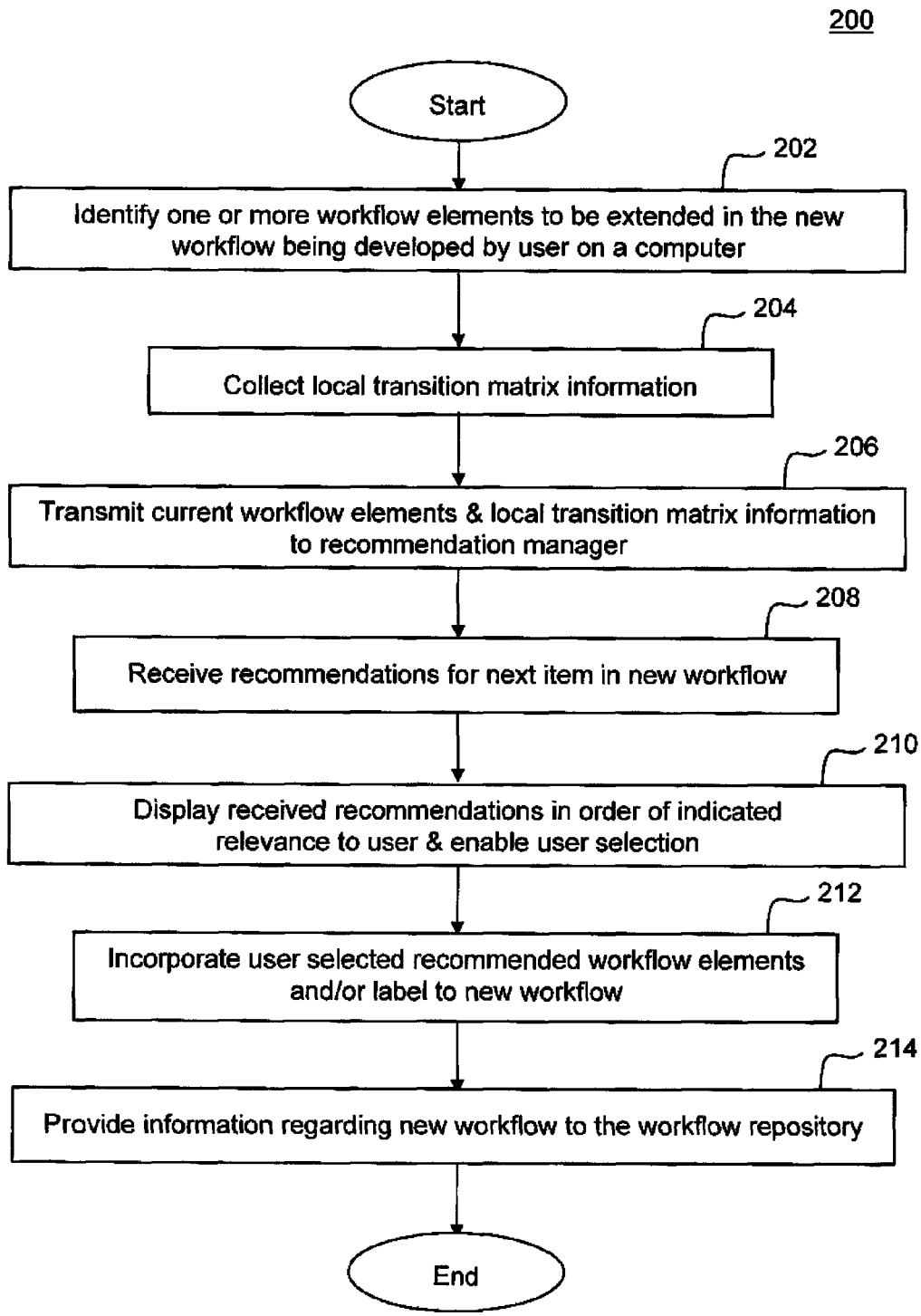
FIG. 2 shows a flowchart for a method performed on a workflow IDE to predict workflow elements to be incorporated into a new workflow, according to one or more embodiments.

FIG. 2 shows a flowchart for a method 200 performed by a workflow IDE, or a computer at which a workflow IDE is running, to predict workflow elements to be incorporated into a new workflow, according to one or more embodiments. A person of skill in the art would understand that operations 202-214 may be performed in the order shown, or in another order. In some embodiments, one or more operations 202-214 may not be performed. Method 200 may be performed on one or more of user computers 102 and 106. For example, method 200 may be performed by workflow development environment 104 when a user of computer 102 is developing a new workflow.

At operation 202, a workflow element that is to be extended in the new workflow is identified. The identified workflow element may be the workflow element that was last added to the new workflow. In another embodiment, the identified workflow element is selected based on user input from a plurality of workflow elements in the new workflow that are not themselves an end state (e.g., workflow process states or event representing the end of a workflow).

At operation 204, local transition matrix information is collected. One or more local transition matrices represent the new workflow, in its current configuration (e.g., the workflow elements that are currently included in the new workflow), in matrix form. The table 504 shown in FIG. 5B represents a transition matrix derived based upon the workflow shown in FIG. 5A. Transition matrices are further described below in relation to FIGS. 5A-5B.

At operation 206, a request for a next workflow element recommendation is transmitted. The request may be transmitted by the workflow development environment to a recommendation manager (e.g., from workflow development environment 104 to recommendation manager 114). The request includes the identified workflow element to be extended. The request may also include information describing the current configuration of the new workflow, such as the one or more local transition matrices collected in operation 204. The local transition matrices provide the receiver of the request with context information regarding the new workflow. As discussed in relation to FIG. 3 below, the context information is used by the receiver (e.g., the recommendation manager) of the request to make recommendations regarding the next workflow element in a context-aware manner. In addition to the identified workflow element to be extended and the information describing the current configuration of the new workflow, the request may also include one or more of information regarding the user (e.g., developer of the new workflow), new workflow context information, and partial label information based upon user input. The information regarding the user and/or new workflow context information can further enhance the context-aware selection of the recommendations. The partial label information comprises any text that the user has inputted for assigning as a label for the next workflow element, and may be used by the receiver of the request to filter the choices for the label to be assigned to the next workflow element.

At operation 208, a workflow element recommendation is received. The recommendation may include one or more workflow elements. In some embodiments, the recommendation may include a plurality of choices for the next workflow element and one or more choices for labels associated with each workflow element choice. The choices for next workflow element may be ordered according to a relative relevance or likelihood of being selected as the next workflow element. In some embodiments, a relevance score may be associated with each of the choices for next workflow element. The choices for label may be either arranged in accordance with relevance or each label may have a relevance score or weight associated with it. The relevance score or weight of a label indicates a measure of relevance of the label to the workflow element it is associated with. The recommendation may be received from the recommendation manager.

At operation 210, the received recommendations are displayed to the user. The display may be arranged in accordance with the relevance of the choices for next workflow element. In addition, if label recommendations are provided, they may be arranged in accordance with the relevance for the respective next workflow element choice. User selection from the displayed choices for next workflow element may then be received indicating the user's choice. Based upon user input, one or more of a user selected choice for next workflow element and a user selected choice for the next label are determined.

At operation 212, the user selected recommendation is incorporated into the new workflow. Incorporating the user selected recommendation to the new workflow may include configuring the new workflow in a memory of the computer so that the user selected next workflow element is included in the new workflow, and updating the display to include the new workflow including the selected new workflow element. Incorporating the user selected recommendation to the new workflow may also include updating the local transition matrices to account for the change in the new workflow. Moreover, incorporating the user selected recommendation to the new workflow may include updating the workflow in the memory and on the display to include the user selected label if one exists.

Operations 202-212 may be repeated to develop a complete workflow. In an embodiment, the automatic or manual selection of a specific state representing an end of a workflow may be used to determine that the development of the workflow is complete.

At operation 214, optionally, information regarding the new workflow is provided to the workflow repository. Information regarding the new workflow may include the actual workflow elements and interconnections, workflow descriptions, local transition matrices describing the new workflow and other information (e.g., user information) that provides context information regarding the new workflow. By updating the workflow repository with new workflow information, the system of predicting the next workflow element continuously learns what workflow elements are actually selected by the users and used the learned information to refine the transition matrices and probabilities associated with transitions between workflow elements. In one embodiment, the information regarding the new workflow is provided to the workflow repository when the development of the new workflow is complete. In another embodiment, the information may be provided after some or all updates to the new workflow. In yet other embodiments, the information may not be provided to the workflow repository. The information received by the workflow repository may be saved in a manner so that it can be searched and/or retrieved based upon user and/or other context information provided in a request for recommendation.

Figure 3:
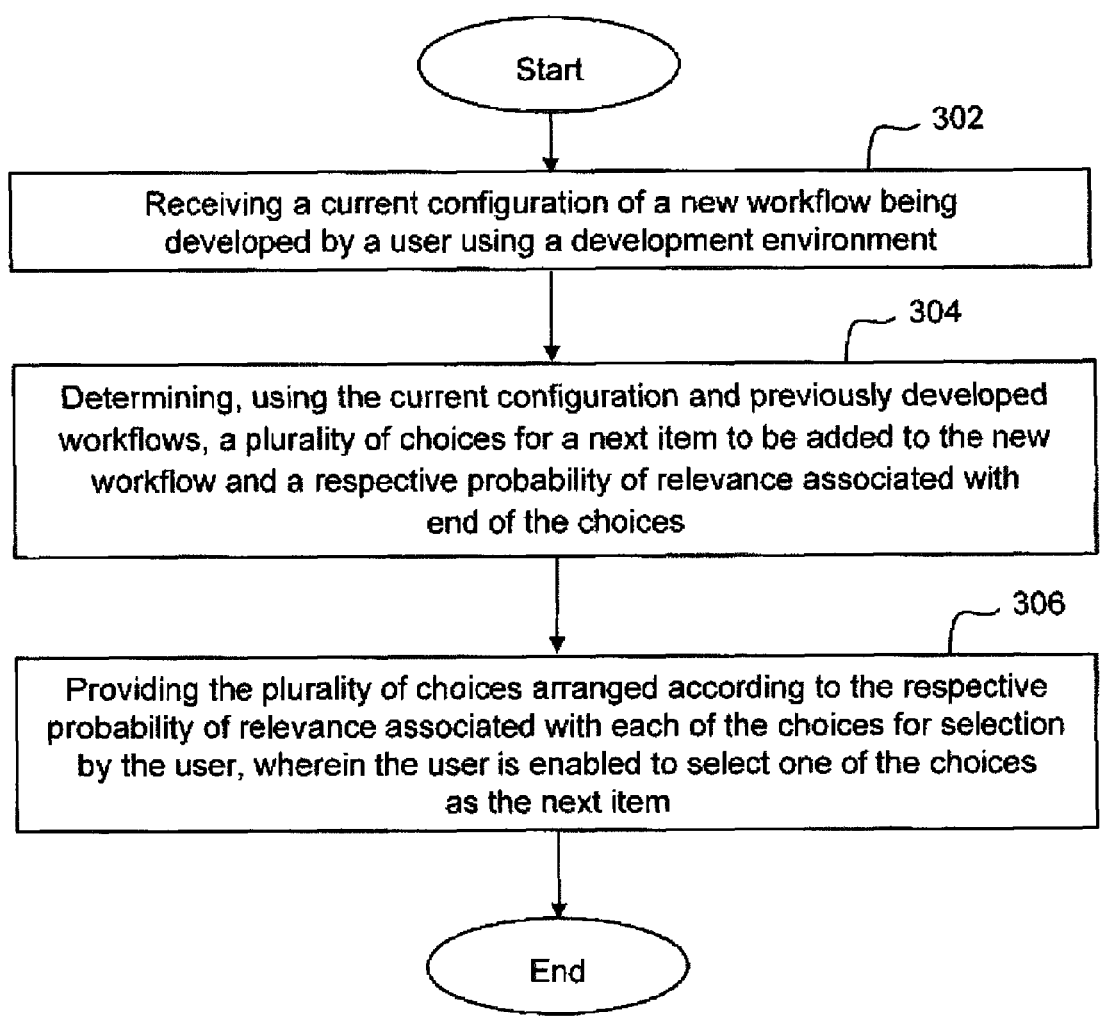
FIG. 3 shows a flowchart for a method performed by a recommendation manager to provide predictions of workflow elements, according to one or more embodiments.

FIG. 3 shows a flowchart for a method 300 performed by a recommendation manager, such as, for example, recommendation manager 114, to provide predictions of workflow elements, according to some embodiments. It would be understood by a person of skill in the art, that operations 302-306 may be performed in the order shown, or in another order. In an illustrative embodiment, method 300 is performed by recommendation manager 114 when it receives a request for recommendations for a next workflow element from workflow development environment 104.

At operation 302, information regarding the current configuration of the new workflow is received in association with the request for recommendations for a next workflow element for the new workflow. The workflow element that is to be extended, user information, context information of the new workflow, one or more local transition matrices of the new workflow may be received with the request. Additionally, partial label information may also be included in the received request.

At operation 304, a plurality of choices is determined as recommendations for the next workflow element. Based upon the information received from the workflow development environment, the recommendation manager may, in collaboration with the user context manager and transition matrix generator and/or transition matrix repository, determine the workflow elements to be recommended. The determining of the workflow elements to be recommended is described in relation to, for example, FIGS. 10-12.

At operation 306, the recommendations for the next workflow element are returned to the requester. Recommendation manager 114 returns the recommendations to workflow development environment 104 so that the user may then select from among the provided recommendations.

Figure 4:
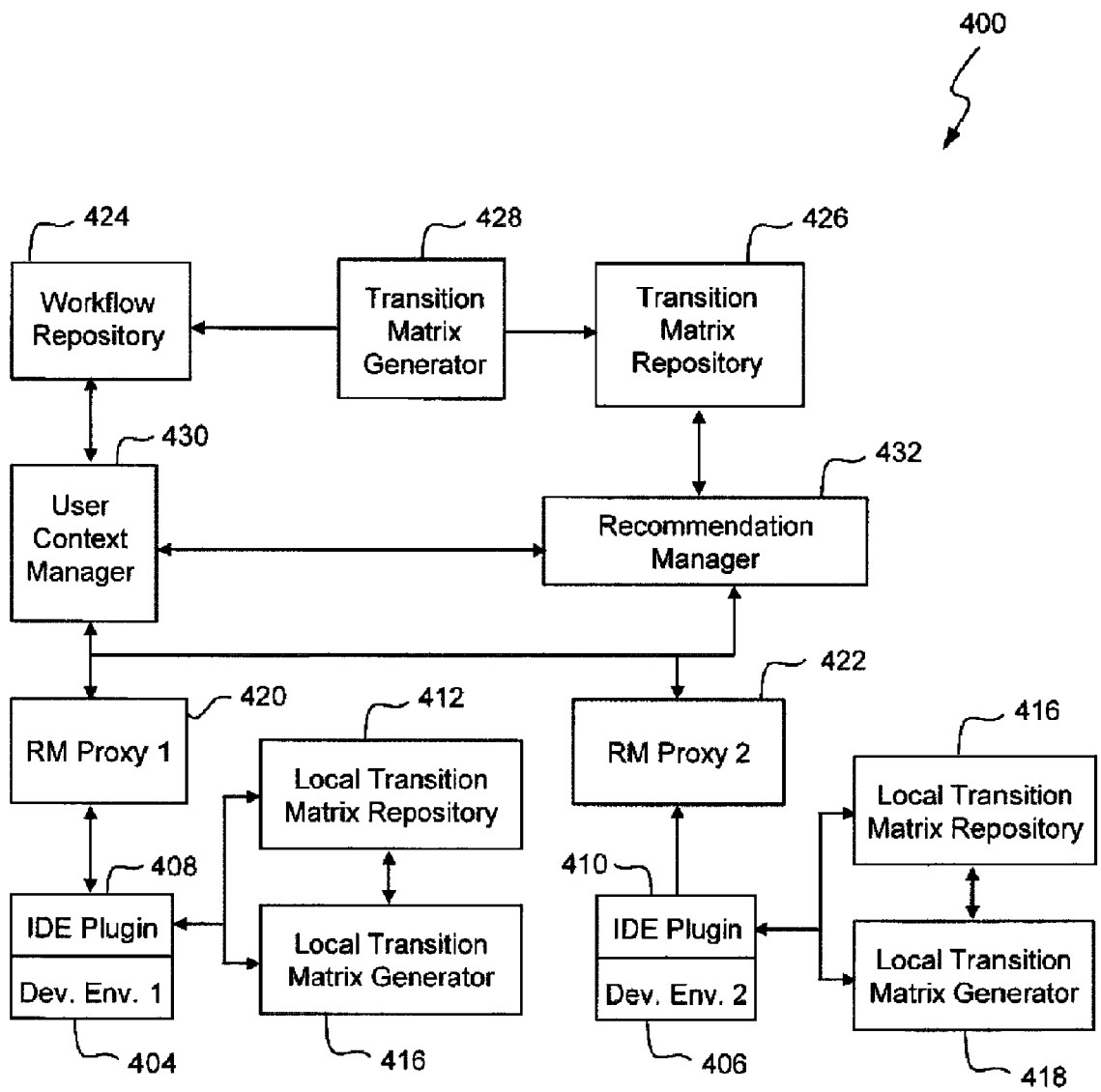
FIG. 4 shows a function block diagram of a system for predicting workflow elements to be incorporated into a new workflow, according to one or more embodiments.

FIG. 4 shows a function block diagram 400 of a system, such as system 100, for predicting workflow elements to be incorporated into a new workflow, according to one or more embodiments.

A first workflow development environment 404, such as, workflow development environments 104 or 108 described above, may provide a graphical user interface using which a developer creates or modifies a new workflow. First workflow development environment 404 (alone or in association with IDE plugin 408) is configured to perform the operations described in relation to method 100.

First workflow development environment 404 requests for, and receives, recommendations for the next workflow element to be used in the new workflow from recommendation manager 432. Recommendation manager 432 interacts with a user context manager 430 and a transition matrix repository 426 and/or transition matrix generator 428 to generate a plurality of choices for providing as recommendations to first development environment 404. In an embodiment, recommendation manager 432 combines transition matrices of previously developed workflows as ranked based upon their similarity to the new workflow, and local transition matrices of the new workflow to create a merged transition matrix. The merged transition matrix is used for predicting next workflow element choices. Deriving the merged transition matrix is described below in relation to FIG. 12. Determining the choices or predictions for the next workflow element is described below in relation to FIGS. 8, 9, and 11.

User context manager 430 operates to store new workflow information received from workflow development environments in a workflow repository 424 and to provide recommendation manager 432 with access to previously developed workflows in workflow repository 424 in a context-aware manner. Context-aware selection of previously developed workflows is further described below in relation to FIG. 10. In some embodiments, user context manager 430 may interact with a user to selectively store previously developed workflows in workflow repository 424.

A transition matrix generator 428 operates to generate transition matrices corresponding to workflows, such as, the previously developed workflows in workflow repository 424. The transition matrix generator generates matrices that capture the dimensions of respective workflows. An example of a dimension of a workflow is a list of probabilities between possible transitions among elements as shown in FIG. 5B.

Transition matrix generator 428 may store the generated transition matrices in transition matrix repository 426. Transition matrix repository 426 stores different transition matrices per workflow in order to avoid re-computations.

A plug-in module, such as IDE plugin 408, may provide an interface for the development environments to the rest of the system including the recommendation manager 432 and user context manager 430. By using a plug-in module, such as IDE plugin 408, existing workflow development environments such as Eclipse™ or the Service Creation Environment of Ericsson's Advanced Composition Engine™ can be enhanced to have features of the disclosed embodiments. Each development environment may maintain its own local transition matrix generator and transition matrix repository to generate and to store the transition matrices corresponding to the new workflow while it is being developed. In the illustrated embodiment, development environment 404, via IDE plugin 408, communicates with its local transition matrix generator 416 and local transition matrix repository 412. Local transition matrix generator 416 operates to generate and/or update the corresponding local transition matrices when a change affecting the transition matrices is made to the new workflow. Local transition matrix generator 416 also operates to store the generated or updated matrices in the local transition matrix repository 412.

A proxy, such as RM proxy 420, may operate to improve the efficiency of the system by caching information received from the recommendation manager so that repeated messages to the recommendation manager can be reduced during the development of the new workflow.

A person of skill in the art would appreciate that any number of development environments may access the system illustrated with block diagram 400. A second development environment 406, with its associated IDE plugin 410, local transition matrix generator 418, local transition matrix repository 416, and RM proxy 422 is shown in FIG. 4.

FIG. 5A shows an example workflow 502 and a corresponding transition table 504, according to one or more embodiments.

Workflow 502 illustrates the events, tasks, and decisions in a process defined for handling a customer complaint. For example, workflow 502 may define the activities to be performed when a customer service representative receives a call from a customer complaining about a service issue.

Workflow 502 begins with event 506 which represents a state in which a customer problem has been received. From event 506, obtaining a description of the problem as represented by task 508, takes the customer service representative to a state 510 (a decision state) in which she is required to make a decision whether she can handle the call herself. A negative decision would cause her to perform task 512 to request assistance from higher level service representatives. Receiving a response from the higher level service representatives takes the customer service representative to event 514. From, either event 514 or from a positive decision at decision state 510, the customer service representative would perform the task of explaining the solution, shown as task 516, to reach an end state, and conclude the workflow.

FIG. 5B shows a representation of an example transition matrix 504 derived based upon workflow 502. In example workflow 502, three different types of workflow elements are present: events, decisions, and tasks. Each different type of workflow element is represented in a respective row and a respective column in the transition matrix. Thus, the corresponding transition matrix has 3×3 matrix values, where each matrix value represents the normalized number of times, in workflow 502, the type of workflow element represented by the particular row is followed by the type of workflow element represented by the corresponding column, or vice versa. For example, with respect to workflow 502, the first row of table 504 indicates that a task follows an event every time, and that an event or decision never follows an event. The second row indicates that an event or decision follows a task with equal likelihood of 0.5 each, and that a task never follows another task. The third row indicates that a decision is always followed by a task, and no other element type follows a task.

Figure 6:
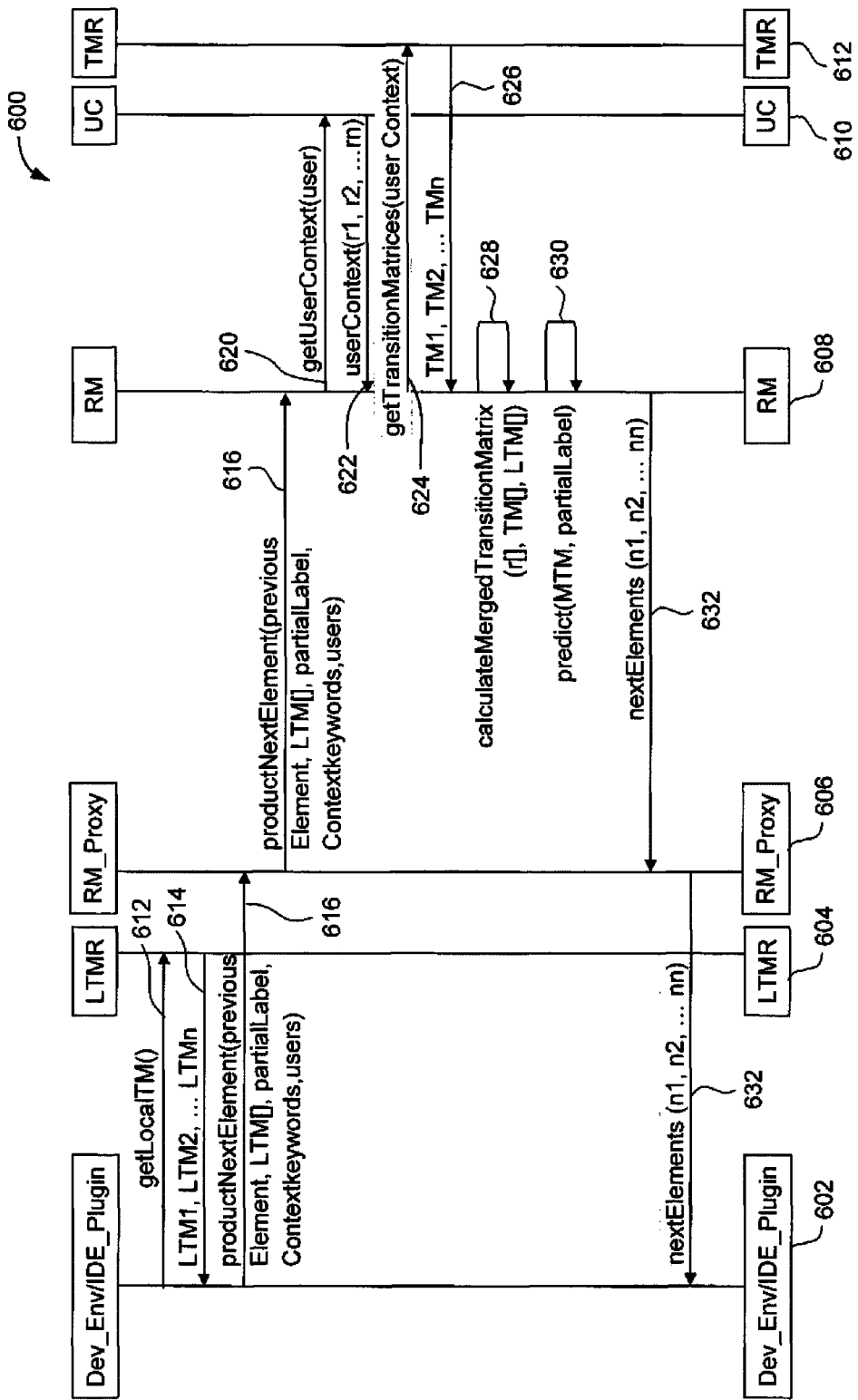
FIG. 6 shows a flow diagram for a method for predicting workflow elements to be incorporated into a new workflow, according to one or more embodiments.

FIG. 6 shows a flow diagram 600 for predicting workflow elements to be incorporated into a new workflow, according to one or more embodiments. Flow diagram 600 graphically illustrates interactions and sequencing of operations, according to one or more embodiments, among function block elements shown in FIG. 4 when methods 200 and 300 are performed.

A development environment 602 (e.g., development environment 404 with IDE plugin 406) initiates the process for obtaining recommendations for a new workflow being developed, by transmitting a request 612 to a local transition matrix repository 604 (e.g., local transition matrix repository 412 and/or local transition matrix generator 416) to obtain local transition matrices corresponding to the new workflow, in response to which the local transition matrix repository 604 sends a response 614 including the requested one or more local transition matrices.

Thereafter, development environment 602 transmits a request 616, via a recommendation manager proxy 606, to the recommendation manager 608 (e.g., recommendation manager 432). Request 616, may or may not be altered by proxy 606. Request 616 includes previous workflow element, local transition matrix information, partial label context keywords based upon user input, and user information.

Upon receiving request 616, recommendation manager 608, transmits a request 620 to a user context manager 610 (e.g., user context manager 430 and workflow repository 424) to obtain information regarding previously developed workflows by the user. User context manager 610 responds 622 by returning the requested information from the workflow repository.

Recommendation manager 608, then requests 624 the transition matrix repository 612 (e.g., transition matrix generator 428 and/or transition matrix repository 426) for the transition matrices corresponding to the information returned in 622. Request 624 includes some or all the information returned in response 622. Transition matrix repository 612, based upon the transition matrices already stored or by calculating, returns 626 the requested transition matrices.

Having now received the workflows according to context, and corresponding transition matrices, and local transition matrices, recommendation manager 608 performs operations 628 to calculate a merged transition matrix. Next, using the calculated merged transition matrix, recommendation manager 608 performs operations 630 to predict next elements for the new workflow. Operations 630 may also consider the partial label information received in request 616. The predicted next elements may include workflow elements only or workflow elements and labels.

The predicted elements (and labels, if available) are then returned in a message 632 to the requesting development environment 602 via proxy 606.

Figure 7:
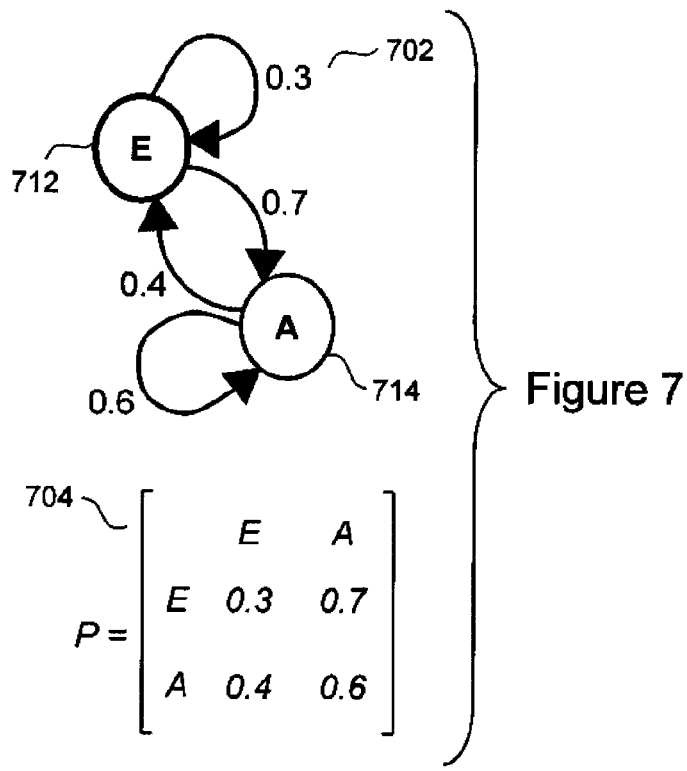
FIG. 7 shows an exemplary element transition model and corresponding probability matrix for selected transitions, according to one or more embodiments.

FIG. 7 shows an exemplary element transition model 702 and probability matrix 704 that can be used in predicting the next elements to be used in a new workflow. For example, recommendation manager 432 may use element transition model 702 and corresponding probability matrix 704 when predicting the choices for the next workflow element. Element transition model 702 may, in some embodiments, be a Markov Chain. Element transition model 702 can be based upon the merged transition matrix generated at the recommendation manager. For example, element transition model 702 may be derived based upon the row corresponding to the workflow element identified as the element that is to be extended (e.g., last element added to the new workflow) in the new workflow.

Example element transition model 702 illustrates two states 712 and 714, representing two distinct element types in workflows, and the respective probabilities associated with each element type as the next element for the new workflow. For example, if the last element is 712, then the probability of having 714 as the next element would be 0.7. As shown, element transition model 702 is only an example, and persons skilled in the art would understand that element transition model 702 may include as many elements as there are distinct elements in the workflows being considered. The probabilities associated with the transitions are also illustrated in probability matrix 704 which may correspond to the entire merged transition matrix or a selected portion of the merged transition matrix.

Figure 8:
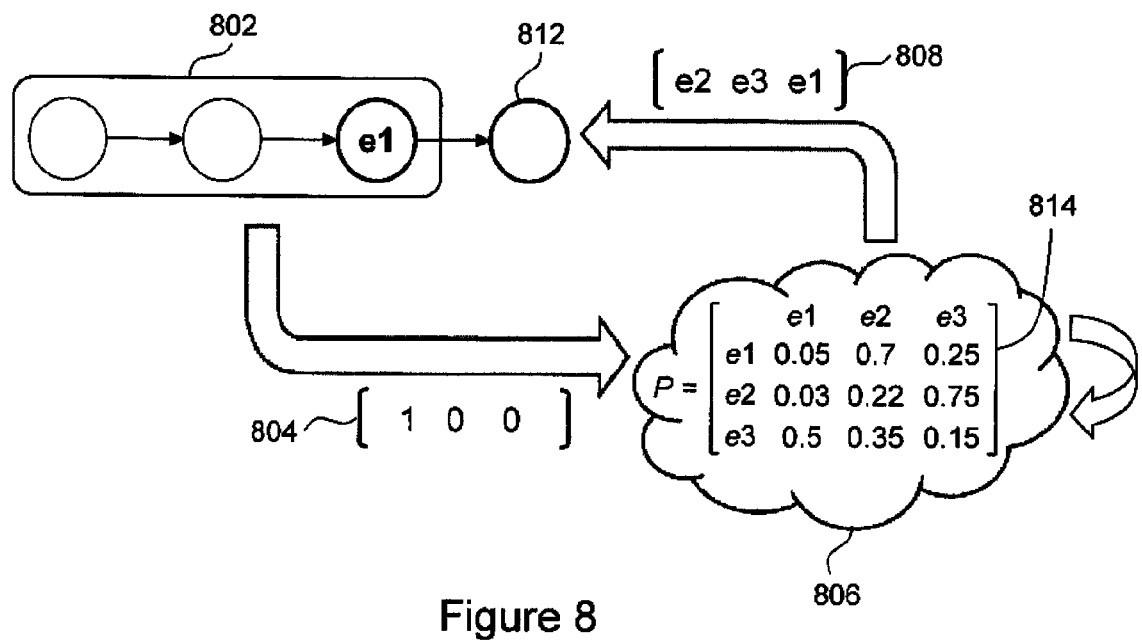
FIG. 8 shows a logical flow of information to and between an example workflow IDE and other parts of the system when predicting workflow element, in accordance with one or more embodiments.

FIG. 8 shows a logical flow of information to and between a workflow IDE and other parts of the system when predicting workflow elements, in accordance with one or more embodiments. As shown in FIG. 8, a message 804 from a computer on which a new workflow 802 is being developed is sent to a server in a cloud network 806. Message 804, among other information, includes the last workflow element added to the new workflow 802. For example, vector [1 0 0] in message 804 is understood by the server in the cloud as, according to a known ordering of workflow element types, the first element type has been selected in the last element that was added to the new workflow 802.

The server in cloud network 806, perhaps in collaboration with other nodes, determines a probability matrix 814 based upon the current configuration of the new workflow and selected previously developed workflows stored in cloud network 806. Based upon probability matrix 814, recommendations for the next element are sent to new workflow 802. The recommendations may be forwarded as a vector 808 of elements with an indication of their respective relative relevance. For example, vector 808 has ordered elements e2 e3 e1 that corresponds to the highest to lowest values in the probability matrix 814 in the row corresponding to element e1. New workflow 802 is then enhanced by selecting an element from vector 808 as next element 802.

Figure 9:
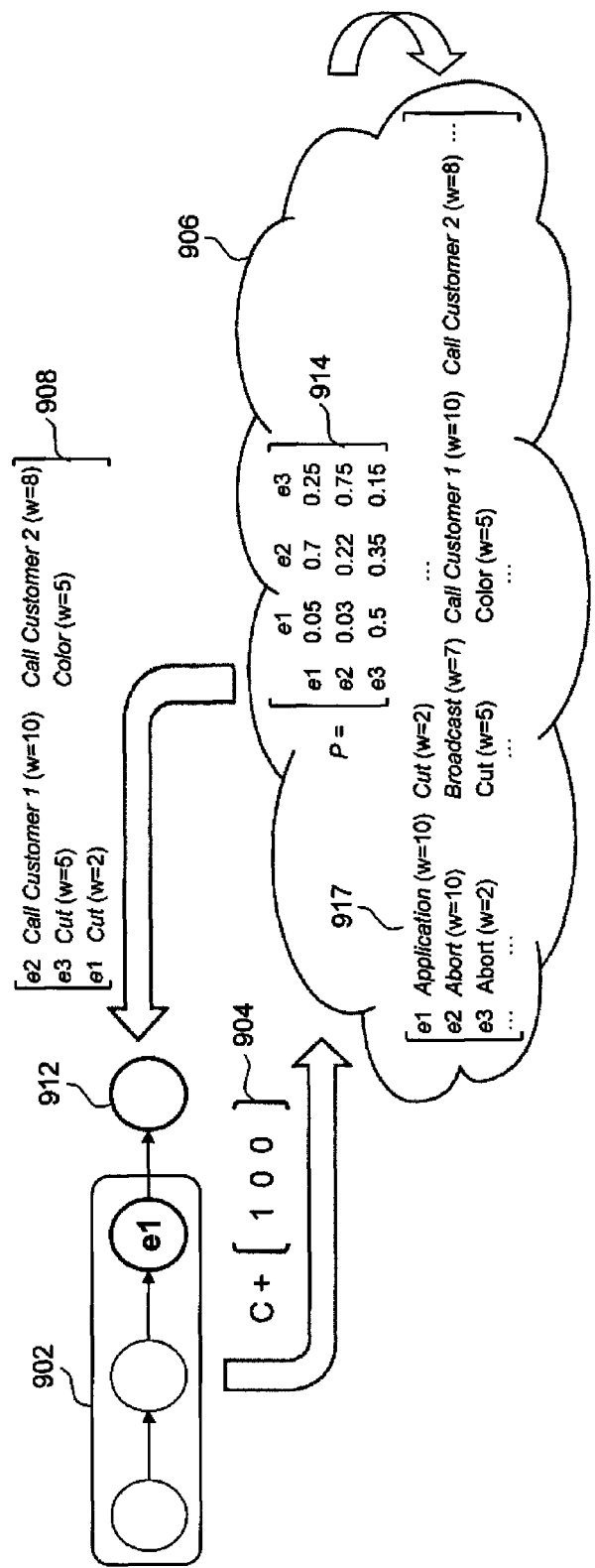
FIG. 9 shows a logical flow of information to and between an example workflow IDE and other parts of the system when predicting workflow elements and workflow element labels, in accordance with one or more embodiments.

FIG. 9 shows a logical flow of information to and between an example workflow IDE and other parts of the system when predicting workflow elements and labels, in accordance with one or more embodiments.

A message 904 from a computer on which a new workflow 902 is being developed is sent to a server in a cloud network 906. Message 904, among other information, includes the last workflow element added to the new workflow 902 and may also include a partial label which the user has begun to type for the next element, which in this example is only character "C". Vector [1 0 0] in message 904 is understood by the server in the cloud as, according to a known ordering of workflow element types, the first element type has been selected in the last element that was added to the new workflow 902.

The server in cloud network 906, perhaps in collaboration with other nodes, determines a probability matrix 914 based upon the current configuration of the new workflow and selected previously developed workflows stored in cloud network 906. Based upon probability matrix 914, recommendations for the next element are sent to new workflow 902. The recommendations may be forwarded as a vector 908 of elements with an indication of their respective relative relevance. For example, vector 908 has ordered elements e2 e3 e1 that corresponds to the highest to lowest values in the probability matrix 914 in the row corresponding to element e1. Additionally, the server in cloud network 906 determines labels 917 associated with each of the elements e1 e2 and e3, and a weight associated with each label with respect to each element type. Some of the determined labels may then be selected for inclusion in association with each of the recommended elements. The recommended next elements with a relative indication of their relevance, and labels associated with each of the recommended elements with an indication as to their relative weight, are then forwarded to the computer on which the new workflow is being developed. New workflow 902 is then enhanced by selecting a workflow element and a corresponding label from vector 908 as next element 902 and its label.

Figure 10:
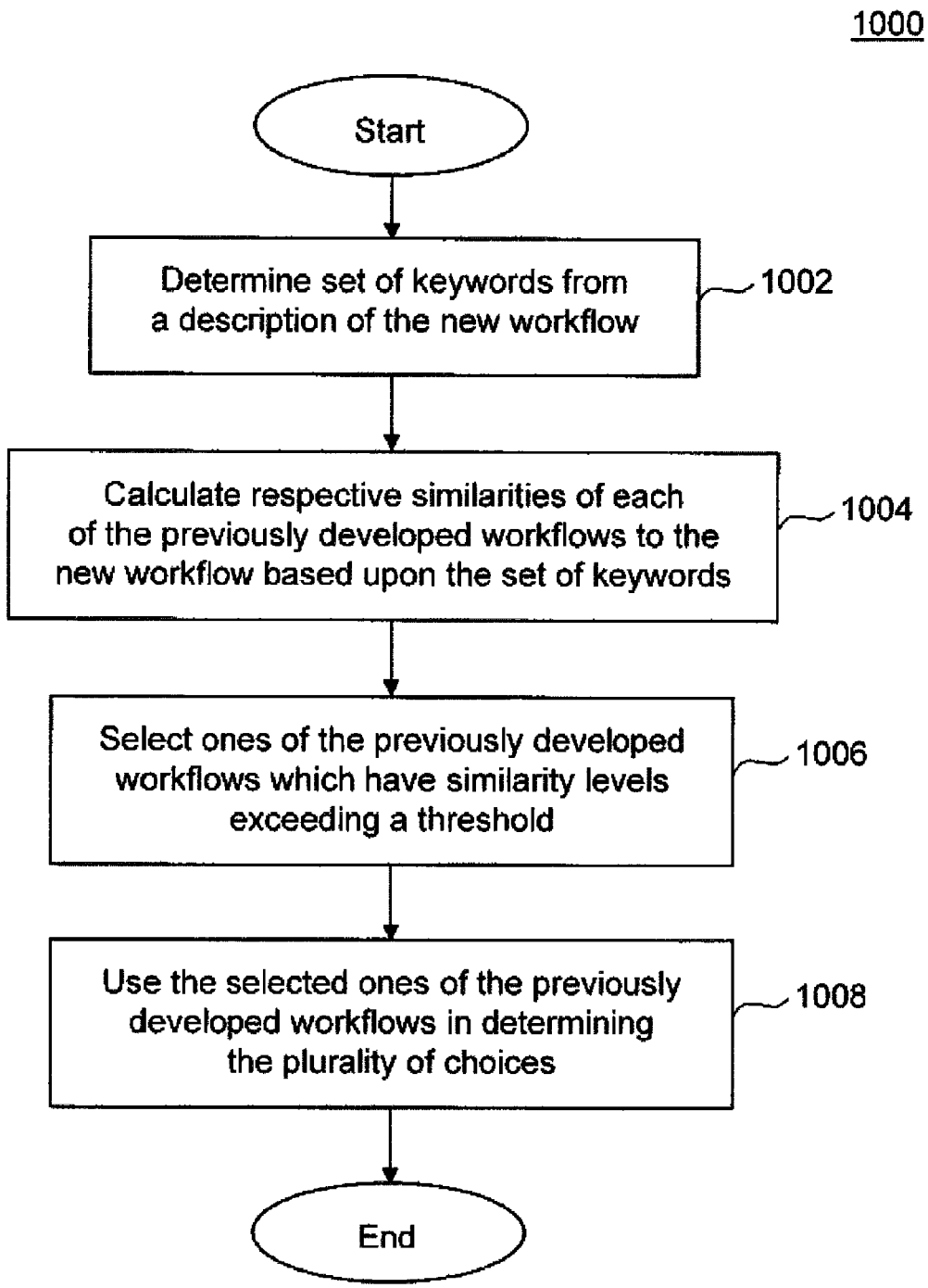
FIG. 10 shows a flowchart of a method for selecting previously developed workflows based upon context of the new workflow, according to one or more embodiments.

FIG. 10 shows a flowchart of a method 1000 for selecting previously developed workflows, according to one or more embodiments. According to one embodiment, method 1000 is performed by user context manager 430 and recommendation manager 432 in order to obtain a one or more previously developed workflows that have a similar context and/or has been developed by the same user, as the new workflow.

At operation 1002 a set of keywords associated with the new workflow is determined. The set of keywords may be determined from a description of the new workflow. For example, workflow development environment 404 may send a textual description of the workflow in association with the request for next element recommendations. The textual description may be input by the user during editing of the new workflow. For example, the set of keywords may be found from the labels or free text elements of the new workflow such as a string "This workflow describes the process for creating a flight reservation".

At operation 1004, respective similarities between each of a plurality of previously developed workflows from those stored in the workflow repository and the new workflow are determined. The similarity may be based upon comparing the set of keywords describing the new workflow, as determined by operation 1002, and keywords associated with each of the stored previously developed workflows. The similarity may be determined as a similarity score associated with each of the plurality of previously developed workflows. The similarity determination may be based upon any technique which determines the similarity between two groups of words or two documents. In an embodiment, a similarity function such as the one term frequency-inverse document frequency model (TF-IDF) model associated with the vector space model for measuring document similarities may be used. In other embodiments, other similarity functions, such as, for example, a Pearson Correlation, may also be used.

At operation 1006, one or more of the previously developed workflows are selected based upon their respective similarity scores. According to an embodiment, a ranking based upon the similarity determined in operation 1004 is assigned to selected previously developed workflows. In some embodiments, only previously developed workflows determined as having a similarity above a configured threshold are selected.

Figure 11:
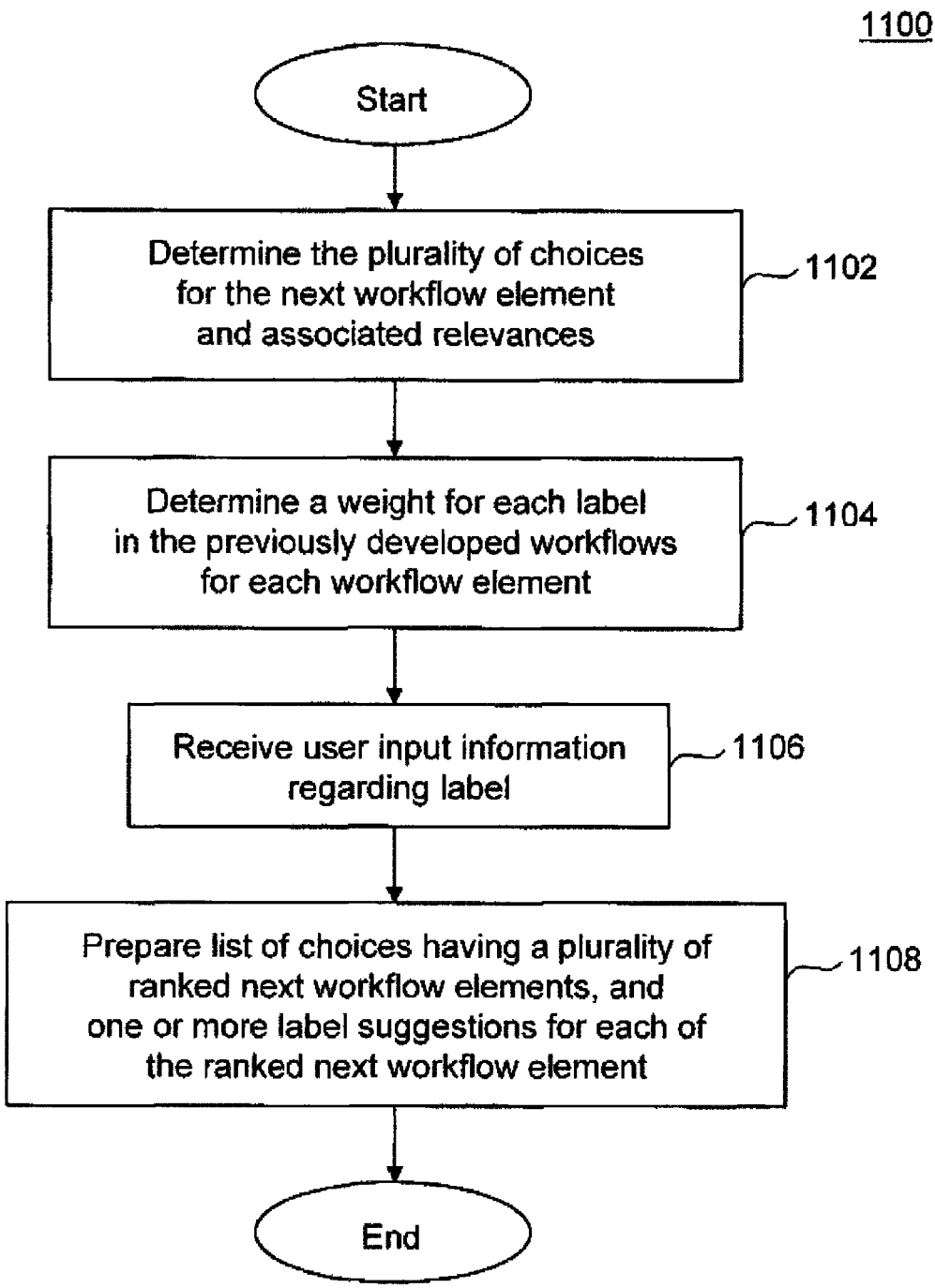
FIG. 11 shows a flowchart of a method for selecting workflow element labels, according to one or more embodiments.

At operation 1008, the selected previously developed workflows are used to determine the recommendations for the next workflow element, as described in relation to FIG. 11.

FIG. 11 shows a flowchart of a method 1100 for selecting choices for the next workflow element and associated labels, according to one or more embodiments. According to an embodiment, method 1100 may be performed by recommendation manager 432 during operation 304 described in relation to method 300.

At operation 1102, the recommendations for next workflow element are determined. In order to determine the recommendations, one or more previously developed workflows are selected based upon similarities in context and/or user, and then a merged transition matrix is created based upon the local transition matrices and the transition matrices corresponding to the selected previously developed workflows. Selection of the previously developed workflows is further described in relation to FIG. 10, and deriving the merged transition matrix is described in relation to FIG. 12.

The merged transition matrix, after normalizing if not already normalized, may be considered as a probability matrix P. Then, considering a vector Π which specifies the identified workflow element that is to be extended in the new workflow, the probabilities for each workflow element to be selected as the next workflow element can be derived as ΠP. FIG. 8 illustrates determining an ordered list of recommendations ΠP=[e2 e3 e1] based upon Π=[1 0 0] indicating that e1 is the identified workflow element that is to be extended in the new workflow, and a matrix 814 as P.

At operation 1104, labels associated with the previously developed workflows are grouped according to each of the recommended next workflow elements. Based upon the grouping, a weight is determined for each label with respect to each recommended next workflow element. The weight of a particular label associated with a particular workflow element may be the number of times that particular label appeared in the group of that particular workflow element. In another embodiment, the labels may be grouped for more element types than only the recommended next workflow element.

At operation 1106, partial label information (e.g., label information partially input by the user for the next element) is received from the user input.

At operation 1108, based upon the received partial label information, one or more label recommendations are selected for each of the recommended next workflow elements. For example, a similarity may be determined based upon the partial label information and each label. Similarity of the labels to that partial label may be determined by matching the partial label to each of the labels (e.g., determining of the partial label is a prefix or substring of a label) or other technique such as determining Levenshtein Distances between the partial label and the labels. The determined similarity can then be used to select the labels for each recommended next workflow elements. The selected labels for each recommended next workflow element can then be presented to the user with an indication of the determined weight when more than one label is suggested for a particular workflow element choice. The number of suggested labels may be limited for each next workflow element based upon a configured threshold value.

As an illustration, item 917 in FIG. 9 shows labels grouped according to workflow element and weighted. Item 908 shows that when the recommendations for the next workflow element are provided to the user, each recommended workflow element is associated with a respective list of labels. Although e2 in 917 has 4 or more associated labels, 908 illustrates that only two of those labels were provided to the user in relation to e2. The two labels for e2 may be selected because they have the highest Levenshtein Distance among all labels in the e2 group, and then the two labels are listed according to their weight. With respect to e3, 917 and 908 show that, two matches are found with different Levenshtein Distances and therefore the label which has the least number of characters is listed first.

Figure 12:
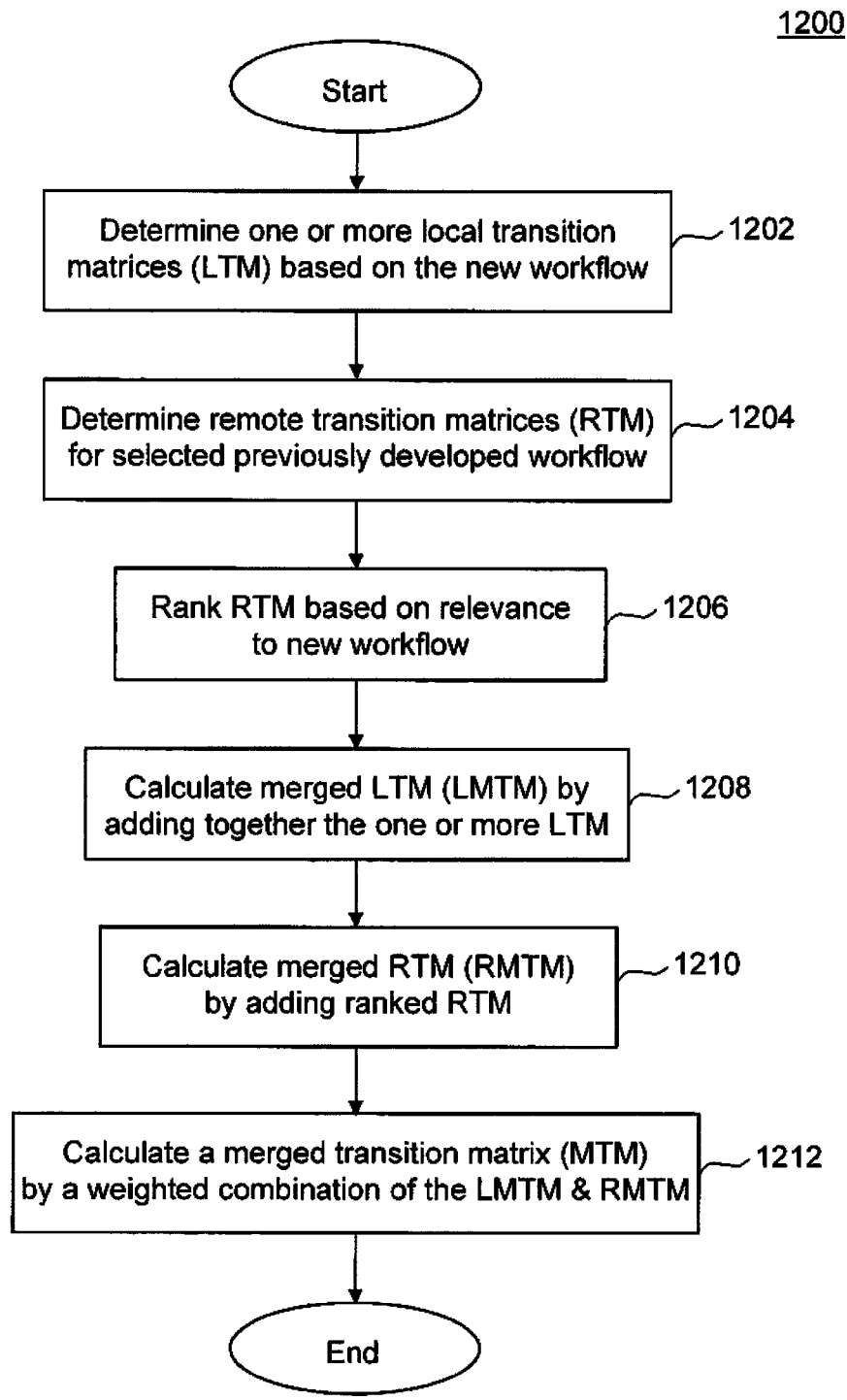
FIG. 12 shows a flowchart of a method for determining a merged transition matrix, according to one or more embodiments.

FIG. 12 shows a flowchart of a method 1200 for determining a merged transition matrix, according to one or more embodiments. According to an embodiment, operations 1206-1212 of method 1200 is performed by recommendation manager 432, operation 1102 by development environment 404, plugin 408, and/or local transition matrix generator 416, and operation 1204 by user context manager 430, transition matrix generator 428 and/or recommendation manager 432.

At operation 1202, one or more local transition matrices are determined for the new workflow. The one or more local transition matrices corresponding to the current configuration of the new workflow may be obtained from the local transition matrix repository 412. For example, operation 612 shown in flow diagram 600 acquires the local transition matrices, which are subsequently provided to the recommendation manager.

At operation 1204, transition matrices are determined for each of a plurality of previously developed workflows. These are referred to as remote transition matrices. This operation may include, the user context manager obtaining workflows with similar context and/or same user from the workflow repository (e.g., see operation 620), obtaining the transition matrices corresponding to the selected previously developed workflows from the transition matrix repository (see e.g., operation 624).

At operation 1206, the remote transition matrices are ranked based upon their relevance to the new workflow. The ranking may be based upon a ranking assigned to the corresponding respective previously developed workflows, for example, by the user context manager 430 or recommendation manager 432. The ranking may be an integer or other numerical score indicative of each of the respective similarity of corresponding selected previously developed workflows to the new workflow.

At operation 1208, a merged local transition matrix is calculated by adding together the local transition matrices. This operation can be represented as:

$$LTM1+LTM2+LTM3+\ldots+LTMN=LMTM$$

where LTM1 . . . LTMN are local transition matrices, LMTM is the merged local transition matrix, and where operator + is applied between matrices. As the matrices may not necessarily contain the same information (e.g., all matrices may not correspond to the same set of workflow element types), a new matrix (possibly with more rows and columns) is produced that contains information from all matrices.

At operation 1210, a merged remote transition matrix is calculated. The remote transition matrices are added together in accordance with their rank determined in operation 1206. This operation can be represented as:

$$R1*TM1+R2*TM2+R3*TM3+\ldots+RN*TMN=RMTM$$

where Rx is the rank of workflow X, TMx (x=1 ... N) are remote transition matrices, and RMTM is the remote merged transition matrix.

At operation 1212, a joint merged transition matrix is determined based upon a weighted addition of the merged local transition matrix and the merged remote transition matrix. This operation can be represented as:

$$a*LMTM+(1-a)*RMTM=MTM$$

where a is a configurable preferred weight used in the local transition matrix, and MTM is the merged transition matrix. The operator * is applied between a number and a matrix by multiplying each element of the matrix with Rx.

The merged transition matrix is subsequently used by the recommendation manager to select the choices or predictions for the next workflow element, as described, for example, in relation to FIGS. 8-9 and 11 above.

The recommendation manager may utilize feedback regarding actual selections in order to refine and/or speedup the process of prediction. In some embodiments, based upon feedback learned based upon actual user selections, transition matrices are updated. Moreover, counts may be maintained by recording how many times each elements has been selected in order to refine the probability values in the merged transition matrix. For example, a updated probability $P_{ij}$ for transition from workflow element i to workflow element j can be maintained by using the formula, $$P_{ij} = \frac{c_{ij}}{\sum_{j \in next(e)} c_{ij}}$$

where $c_{ij}$ is the count of transitions from workflow element i to workflow element j.

Figure 13:
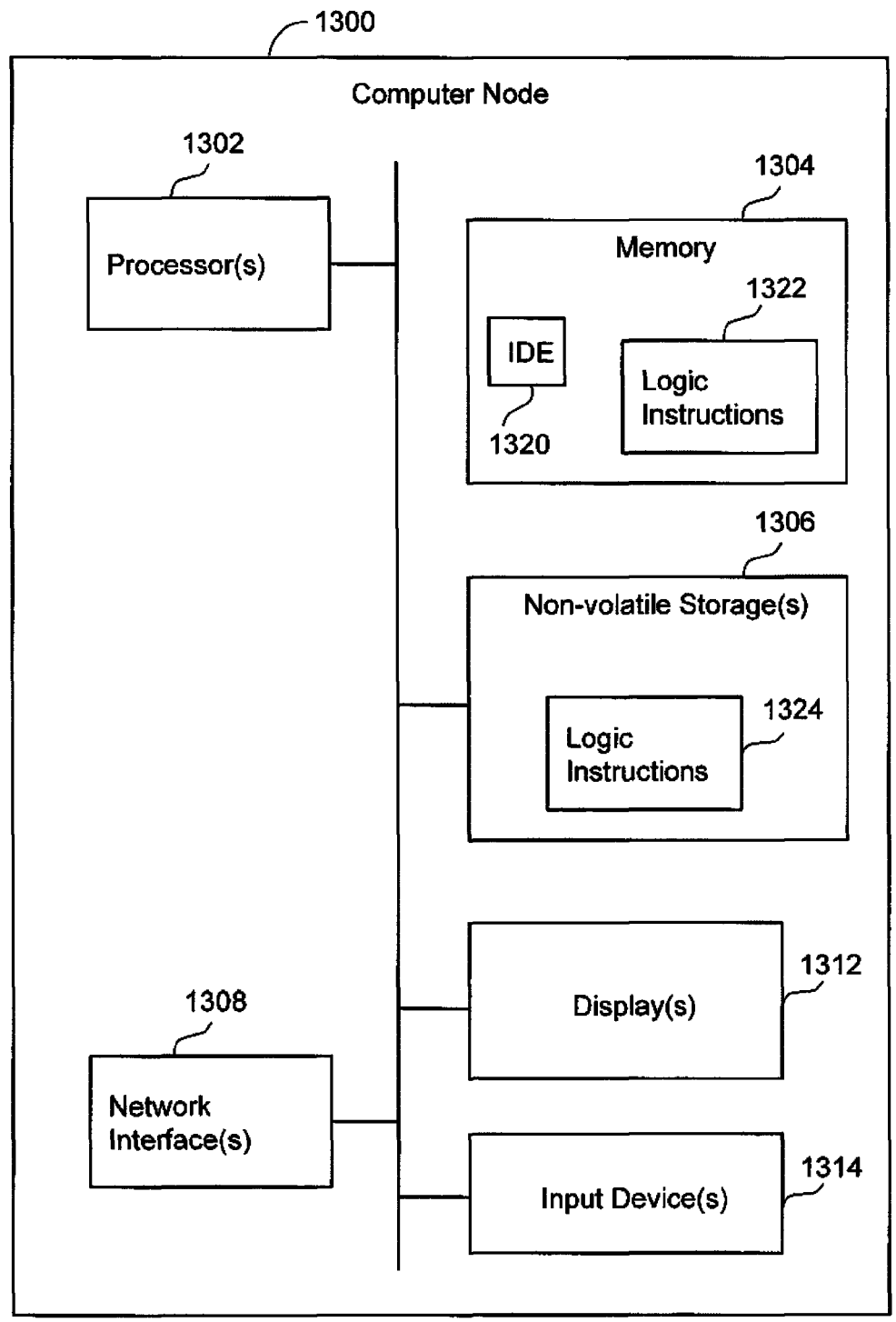
FIG. 13 shows a computer node for executing at least part of the system for predicting workflow elements to be incorporated into a new workflow, according to one or more embodiments.

FIG. 13 shows a computer node 1300 for executing at least part of a system for predicting workflow elements to be incorporated into a new workflow, according to one or more embodiments.

According to an embodiment, entities 102, 106, 114, 112, and 118 may be executed on respective computers such as computer node 1300. However, a person of skill in the art understands that other configurations of entities 102, 106, 114, 112, and 118 in computer nodes are possible and are considered within the scope of the present disclosure. For example, the respective functional blocks shown in FIG. 4 may be distributed among one or more computer nodes in any manner which enables the performance of methods 200, 300, 1000, 1100 and 1200.

Computer node 1300 includes at least one processor 1302, at least one memory 1304, at least one non-volatile storage 1306, one or more display 1312, one or more input devices 1314, and one or more network interfaces 1308, which are communicatively coupled by communication bus 1310. Processor 1302 can include any computer processor capable of executing a sequence of program or logic instructions. Logic instructions corresponding to a computer program may reside as logic instructions 1324 in non-volatile storage and/or as logic instructions 1322 in memory 1304, and may be executed by processor 1320. According to some embodiments, a program 1320 for a workflow development environment may be executed by processor 1302 when computer node 1300 is used as user computer 102.

Memory 1304 may include any type of volatile memory for storing instructions or data. Non-volatile storage 1306 includes hard disk, non-volatile solid state memory devices, and like computer readable memory devices.

Display 1312 may include any kind of display such as, for example, display devices capable of graphical display. Input devices 1314 may include any input device, such as, keyboard, mouse, touch screen, microphone etc., that can provide input to a program executing on computer node 1300.

Network interfaces 1308 may include any type of network interface which enables computer node 1300 to communicate through a network. Example networks accessed by computer 1300 may include the Internet, cloud network 109, a corporate wide area or local area network, a WIFI network, and the like.

Hardware implementation of the described embodiments may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description above contains many specifics, they should not be construed as limiting but as merely providing illustrations of some presently preferred embodiments. Embodiments described herein may be considered as independent embodiments or may be considered in any combination with each other to describe non-limiting examples. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method for automatically predicting workflow elements to be incorporated into a new workflow, comprising:
    receiving, at a processing system including at least one processor, a current configuration of the new workflow, wherein the new workflow is being developed by a user on a workflow development environment executing on a computer;
    determining, using the current configuration and previously developed workflows stored in storage accessible by the processing system, a plurality of workflow element choices for a next element to be added to the new workflow and a respective probability of relevance associated with each of the workflow element choices, wherein determining the plurality of workflow element choices for a next element comprises:

selecting a plurality of next workflow elements, each selected next workflow element being a valid next workflow element for the current configuration of the new workflow;

calculating a respective probability of relevance for each selected next workflow element based upon occurrence characteristics of the selected next workflow element; and selecting one or more next workflow element labels for each selected next workflow element; and providing, by the processing system, the plurality of workflow element choices arranged in accordance with the respective probability of relevance associated with each of the workflow element choices for selection by the user as the next element.

2. The method according to claim 1, wherein the determining a plurality of workflow element choices for a next element comprises the processing system:

selecting workflows that are contextually similar to the new workflow from the previously developed workflows; and determining the plurality of workflow element choices based upon the selected workflows and the current configuration.

3. The method according to claim 1, wherein the determining a plurality of workflow element choices for a next element comprises the processing system:

determining a set of keywords associated with the new workflow;

determining similarities of the new workflow to respective ones of the previously developed workflows based upon the set of keywords; and selecting ones of the previously developed workflows having respective determined similarities that exceed a threshold.

4. The method according to claim 1, wherein the determining a plurality of workflow element choices for a next element comprises the processing system:

combining workflow transition information from the current configuration and the previously developed workflows;

determining the plurality of workflow element choices from the combined workflow transition information; and calculating the respective probability of relevance associated with each of the workflow element choices.

5. The method according to claim 4, wherein the combining workflow transition information comprises performing a weighted combination of matrices representing workflow transitions, and wherein elements of each of the matrices define respective probabilities of a first workflow element type being followed in a workflow by respective second workflow element types.

6. The method according to claim 5, wherein the performing a weighted combination comprises adding of a weighted first matrix representing workflow transitions of the current configuration and a weighted second matrix representing ranked workflow transitions of the previously developed workflows.

7. The method according to claim 6, wherein the first matrix and the second matrix are formed by adding matrices representing the current configuration and the previously developed workflows, respectively.

8. The method according to claim 4, the method further comprising:

updating the workflow transition information from the previously developed workflows in accordance with said one of the workflow element choices selected as the next element by the user.

9. The method according to claim 1, wherein for each said selected next workflow element, each of said selected one or more next workflow element labels is associated with a likelihood that the selected next workflow element label occurs with the selected next workflow element.

10. The method according to claim 9, wherein the likelihood that the selected next workflow element label occurs with the selected next workflow element is determined based upon a count of occurrences of the selected next workflow element label being assigned to the selected next workflow element in the previously developed workflows.

11. The method according to claim 1, wherein the selecting one or more next workflow element labels comprises selecting the one or more next workflow element labels based upon a partial label input by the user as part of a label of the next element, and upon label assignments in the previously developed workflows.

12. The method of claim 1, further comprising:

storing said previously developed workflows in one or more servers connectable by one or more networks to a plurality of processing systems including said processing system, wherein the storage accessed by said processing system is located in the one or more servers.

13. A node for automatically predicting workflow elements to be incorporated into a new workflow, comprising:

memory;

network interface; and a processing system including one or more processors communicatively coupled to the memory and the network interface and configured to:

receive a current configuration of the new workflow, wherein the new workflow is being developed by a user on a workflow development environment executing on a computer;

determine, using the current configuration and previously developed workflows stored in storage accessible by the processing system, a plurality of workflow element choices for a next element to be added to the new workflow and a respective probability of relevance associated with each of the workflow element choices, wherein determining the plurality of workflow element choices for a next element comprises:

selecting a plurality of next workflow elements, each selected next workflow element being a valid next workflow element for the current configuration of the new workflow;

calculating a respective probability of relevance for each selected next workflow element based upon occurrence characteristics of the selected next workflow element; and selecting one or more next workflow element labels for each selected next workflow element; and provide the plurality of workflow element choices arranged in accordance with the respective probability of relevance associated with each of the workflow element choices for selection by the user as the next element.

14. A non-transitory computer-readable storage medium having instructions stored therein for automatically predicting workflow elements to be incorporated into a new workflow, the instructions when executed by at least one processor, causes the processor to perform operations comprising:

receiving a current configuration of the new workflow, wherein the new workflow is being developed by a user on a workflow development environment executing on a computer;

determining, using the current configuration and previously developed workflows stored in storage accessed by the processing system, a plurality of workflow element choices for a next element to be added to the new workflow and a respective probability of relevance associated with each of the workflow element choices, wherein determining the plurality of workflow element choices for a next element comprises:

selecting a plurality of next workflow elements, each selected next workflow element being a valid next workflow element for the current configuration of the new workflow;

calculating a respective probability of relevance for each selected next workflow element based upon occurrence characteristics of the selected next workflow element; and selecting one or more next workflow element labels for each selected next workflow element; and providing the plurality of workflow element choices arranged in accordance with the respective probability of relevance associated with each of the workflow element choices for selection by the user as the next element.

\* \* \* \* \*